US012218819B1

(12) United States Patent
Georgalis et al.

(10) Patent No.: US 12,218,819 B1
(45) Date of Patent: Feb. 4, 2025

(54) TRAFFIC-BASED AUTOMATED SESSION TESTS

(71) Applicant: Cisco Technology, Inc., San Jose, CA (US)

(72) Inventors: Ioannis Georgalis, London (GB); Alexander Camille Cruz Farmer, London (GB); Nicholas Stuart Hutchinson, London (GB); Efstathios Souris, London (GB); Ricardo V. Oliveira, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/103,721

(22) Filed: Jan. 31, 2023

(51) Int. Cl.
*H04L 43/50* (2022.01)
*H04L 43/062* (2022.01)
*H04L 43/0811* (2022.01)

(52) U.S. Cl.
CPC ............ *H04L 43/50* (2013.01); *H04L 43/062* (2013.01); *H04L 43/0811* (2013.01)

(58) Field of Classification Search
CPC ....... H04L 67/51; H04L 67/02; H04L 67/535; H04L 67/1396; H04L 63/1425; H04L 63/102; H04L 43/062; H04L 43/04; H04L 43/02; H04L 43/00; H04L 43/50; H04L 43/08; H04L 43/0805; H04L 43/0811; H04L 43/0817; H04L 43/065; H04L 43/20; H04L 43/16; H04L 43/14; H04L 43/10; H04L 43/12; H04L 47/801; H04L 47/2483; H04L 47/24; H04L 47/2408; H04L 47/2416; H04L 41/5058; H04L 45/3065

See application file for complete search history.

(56) References Cited

U.S. PATENT DOCUMENTS

| 10,372,600 | B2 * | 8/2019 | Mathur ............... G06F 11/3664 |
| 10,623,297 | B2 | 4/2020 | Regev |
| 11,582,316 | B1 * | 2/2023 | Danyi .................... H04L 67/146 |
| 2011/0296384 | A1 * | 12/2011 | Pasternak ........... G06F 11/3688 717/124 |
| 2012/0072544 | A1 | 3/2012 | Pankratov |
| 2014/0297846 | A1 * | 10/2014 | Hoja ..................... H04L 43/106 709/224 |
| 2017/0366421 | A1 * | 12/2017 | Dam ....................... H04L 41/22 |
| 2019/0123981 | A1 | 4/2019 | Johanson et al. |
| 2021/0328856 | A1 * | 10/2021 | Menon .................... H04L 43/12 |
| 2022/0078090 | A1 * | 3/2022 | Sinha .................... H04L 41/147 |
| 2022/0173988 | A1 | 6/2022 | Dam et al. |
| 2022/0276952 | A1 * | 9/2022 | Waldron ............ G06F 11/3688 |

\* cited by examiner

*Primary Examiner* — Rachel J Hackenberg
(74) *Attorney, Agent, or Firm* — BEHMKE INNOVATION GROUP LLC; James M. Behmke; James J. Wong

(57) ABSTRACT

In one embodiment, an example process herein may comprise: monitoring real-time user traffic activity; determining a set of one or more current servers corresponding to the real-time user traffic activity; associating the real-time user traffic activity to one or more user processes; mapping the one or more user processes to a particular application; and configuring one or more tests directed to the set of one or more current servers for the particular application.

13 Claims, 7 Drawing Sheets

TRAFFIC-BASED AUTOMATED SESSION TESTS

TECHNICAL FIELD

The present disclosure relates generally to computer systems, and, more particularly, to traffic-based automated session tests.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to obtain and/or piece together monitoring and logging data across disparate systems, tools, and layers in a network architecture.

In particular, testing may be performed to assess and/or optimize application performance. For example, users may use an endpoint agent to connect to and/or test remote application servers that their computing device connects to or that are otherwise involved in the delivery and/or operations of a particular application. Presently, tests can only be directed to specific remote application servers that are persistent and/or static servers for the application processes and therefore represent persistent and/or static testing targets. Therefore, tests are scheduled to these predetermined, persistent and/or static application servers. However, these testing techniques will not work for native applications where the servers cannot be predetermined since the application can flexibly and/or dynamically decide at runtime which server of a plurality of server options it will use.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an example process herein may comprise: monitoring real-time user traffic activity; determining a set of one or more current servers corresponding to the real-time user traffic activity; associating the real-time user traffic activity to one or more user processes; mapping the one or more user processes to a particular application; and configuring one or more tests directed to the set of one or more current servers for the particular application.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
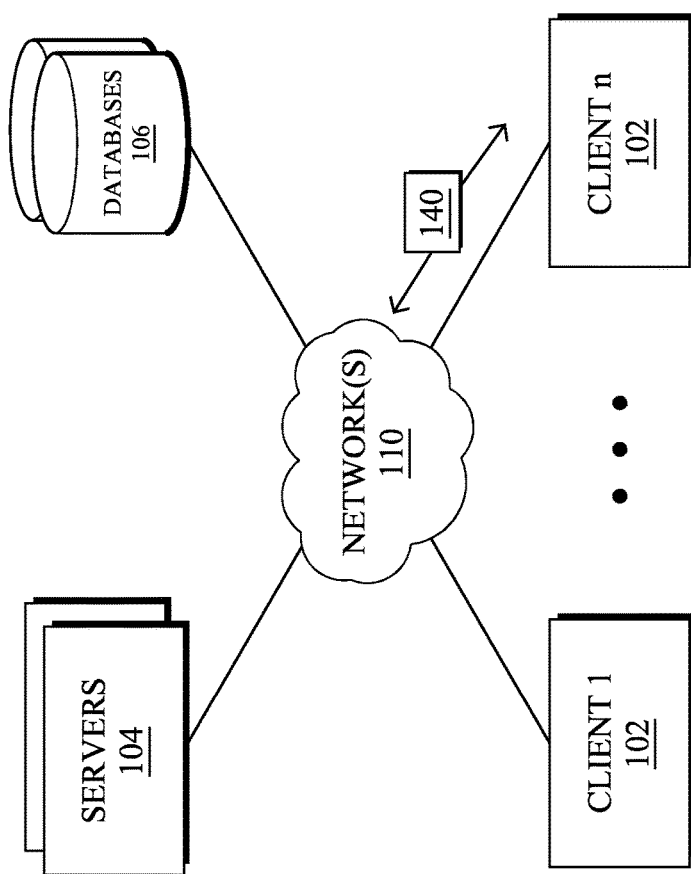
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
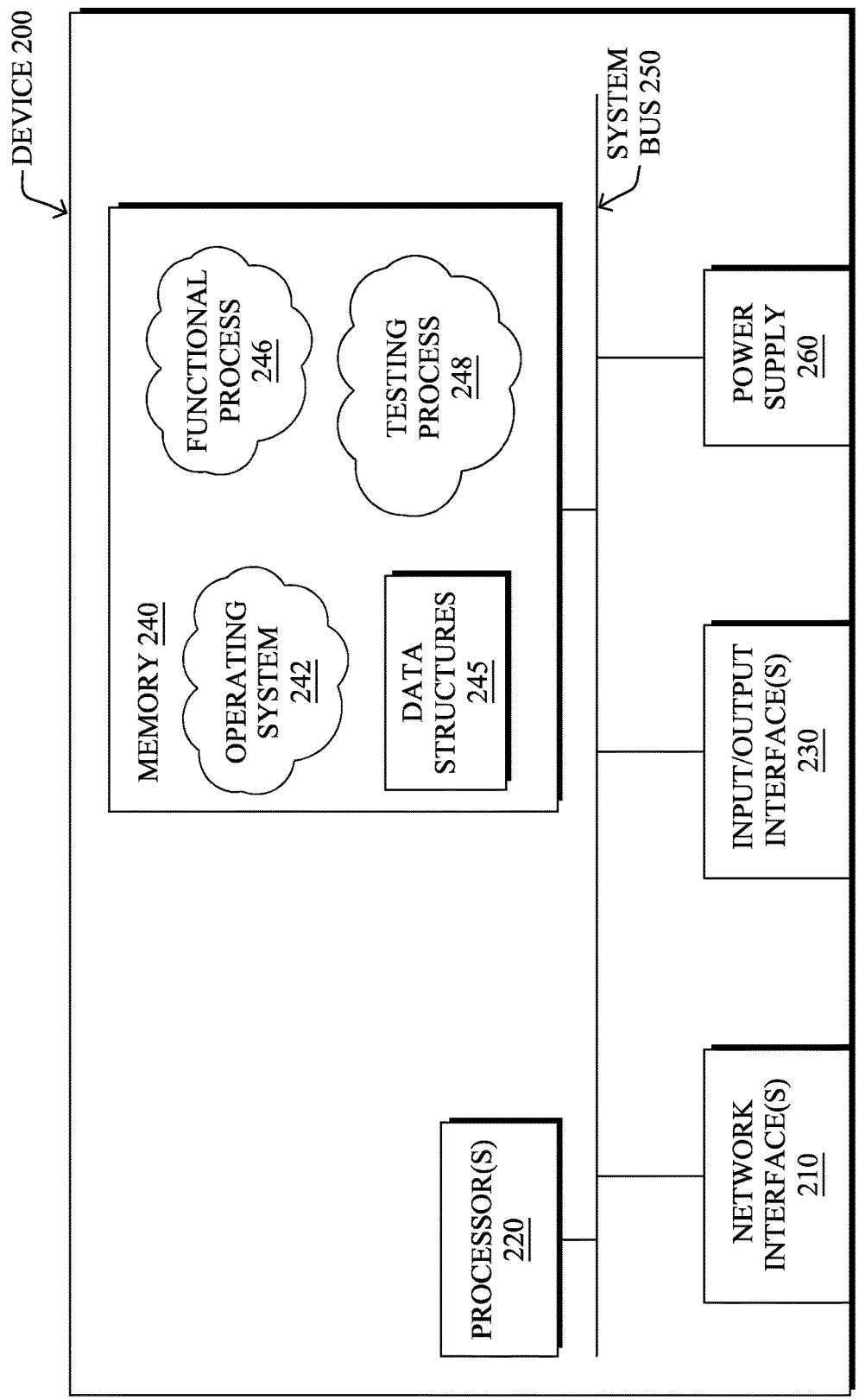
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "testing" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
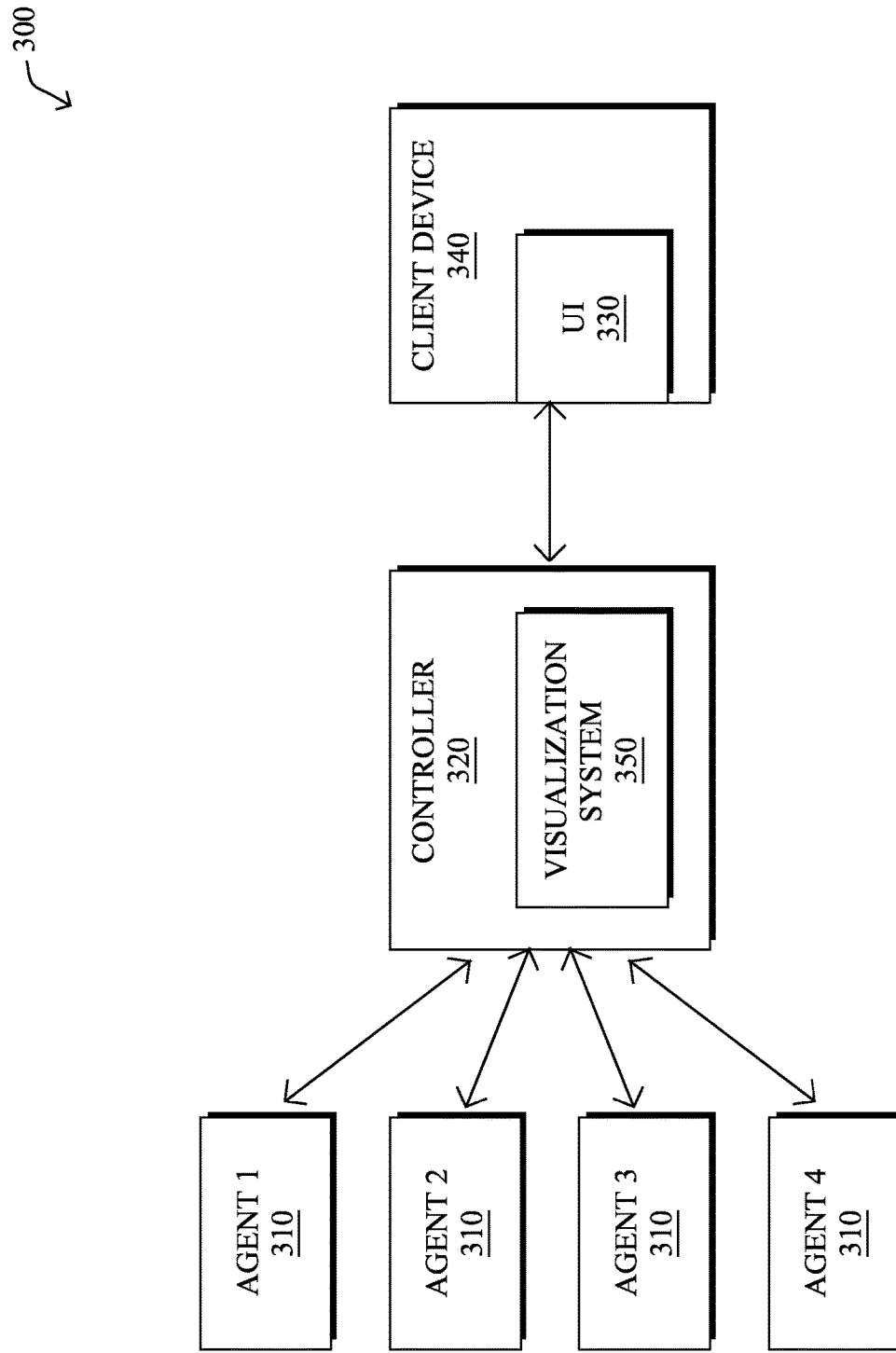
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, application programming interface (API), or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a n instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Traffic-Based Automated Session Tests——

As noted above, there is often a desire to test remote application servers, such as the servers that user devices or their employees' devices connect to when using an application. Presently, systems can only test specific remote application servers that are persistent and/or static servers for the application processes and therefore represent persistent and/or static testing targets. Therefore, scheduled testing (e.g., hypertext transfer protocol (HTTP), network, etc.) are only to these predetermined, persistent and/or static application servers.

However, these server testing techniques will not work for native applications. For example, application servers that will be used by a native application (e.g., collaboration applications, video conferencing applications, chat applications, Webex, Zoom, Microsoft Teams, etc.) cannot be predetermined since those applications may decide, at runtime, both a server to send its data to/receive data from and/or a protocol for sending/receiving the data (e.g., IPv4, IPv6, UDP, TCP, etc.). Therefore, since the server and/or protocol can be dynamic for an application, test configurations (e.g., on an endpoint agent on a client device) cannot rely on predeterminations to know and/or schedule which server and/or which protocol to use for such testing.

Accordingly, it is not presently possible to adequately perform the server testing techniques on the native applications. As a result, observability data, key network performance metrics, etc. cannot be collected properly and/or visualized from the server with native applications, frustrating network monitoring and/or troubleshooting efforts with respect to these applications.

The techniques herein, therefore, introduce traffic-based automated session testing that enables the dynamic identification and active testing of servers used by native applications running on any operating system (e.g., Mac, Windows, etc.). The testing techniques facilitate, for each of the dynamically identified servers, key network performance metrics to be collected and/or visualized (e.g., via an observability platform). In some instance, the testing techniques facilitate a remote server, used by a native application, being dynamically discovered whether it uses transmission control protocol/Internet protocol (TCP/IP), user datagram protocol/Internet protocol (UDP/IP), etc. for communicating with the native application's process(es).

Specifically, according to one or more embodiments described herein, an example process herein may comprise: monitoring real-time user traffic activity; determining a set of one or more current servers corresponding to the real-time user traffic activity; associating the real-time user traffic activity to one or more user processes; mapping the one or more user processes to a particular application; and configuring one or more tests directed to the set of one or more current servers for the particular application.

Figure 4:
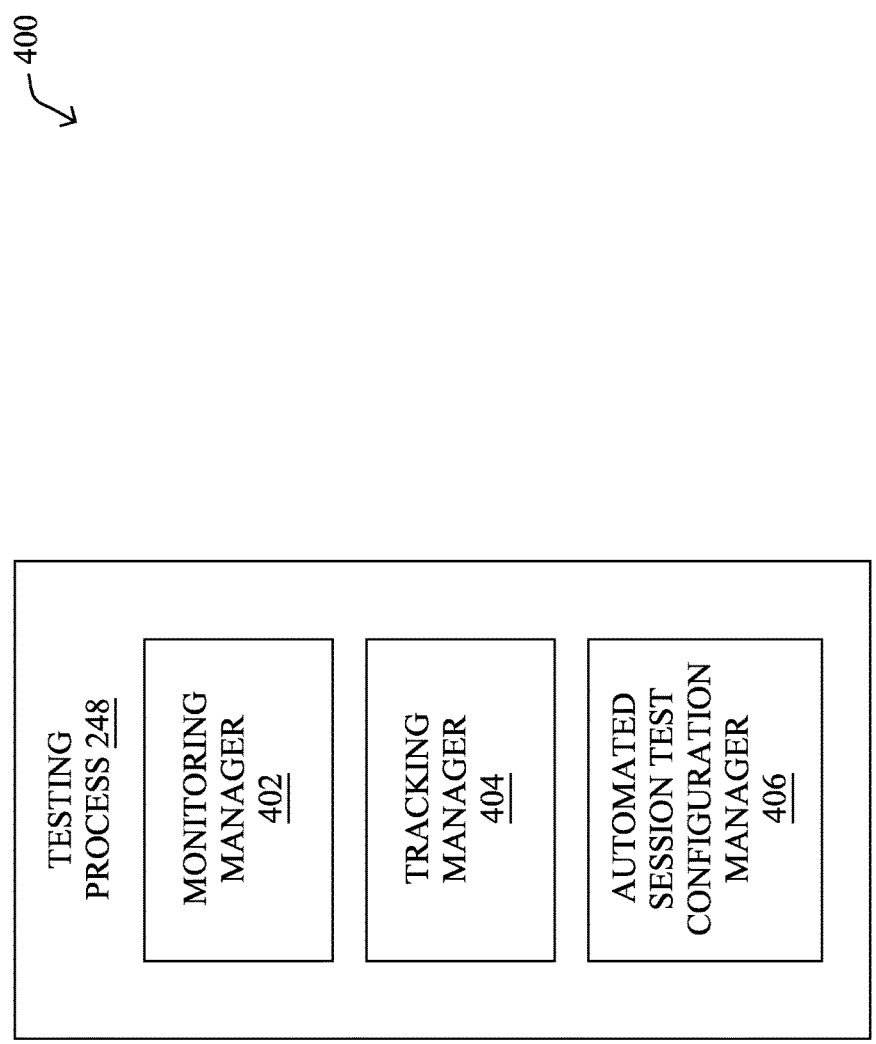
FIG. 4 illustrates an example architecture for traffic-based automated session testing.

Operationally, FIG. 4 illustrates an example architecture 400 for traffic-based automated session testing, according to various embodiments. At the core of this architecture 400 is testing process 248, which may be executed across one or more devices such as by endpoint agents on a user device, by device associated with an observability platform, by a communication node or controller associated with providing a collaboration service or other data delivery over a network, or another device in communication therewith. In general, testing process 248 may be executed to configure automated session tests of servers associated with native applications from end user machines. For instance, testing process 248 may be executed to monitor real-time application activity, determine which remote servers are important for the user experience (UX) of that application, and run tests to those servers in order to collect useful metrics that accurately capture and reflect the observed UX.

As shown, testing process 248 may include monitoring manager 402, tracking manager 404, and/or automated session test configuration manager 406. As would be appreciated, the functionalities of these components may be combined or omitted, as desired. In addition, these components may be implemented on a singular device or in a distributed manner, in which case the combination of executing device can be viewed as their own singular device for purposes of executing testing process 248.

During execution, monitoring manager 402 may manage the collection and/or monitoring of real-time user traffic activity. The user traffic activity may include data traffic generated and/or received by a user device in association with the operation of a native application at the user device. For example, the user traffic activity may include on or more packets of data being generated by a user device, sent by a user device, received by a user device, and/or communicated between the user device and one or more destinations in executing a particular application function or process.

Monitoring manager 402 may collect, monitor, and/or analyze user traffic activity in real-time as it is generated by a user device. That is, monitoring manager 402 may collect, monitor, and/or analyze data communications between a user computing device and a server for an application process while it is occurring. In some instances, monitoring manager 402 may receive and/or analyze the user traffic activity compiled by another component or sub-component in real-time. In some instances, the user traffic activity may be collected in real time and then compiled for subsequent monitoring and/or analysis by monitoring manager 402.

Monitoring manager 402 may include a network flow detector service that may monitor network flows on a user's computing device. This may include monitoring all network flows from all transmission control protocol (TCP) and/or user datagram protocol (UDP) data traffic on a user's computing device in real-time. Therefore, monitoring manager 402 may collect, monitor, and/or analyze various network flows associated with one or more native applications during their execution at the user's device.

Monitoring manager 402 may be configured to collect, monitor, and/or analyze user traffic activity for a variety of protocols and/or across a variety of operating systems. For example, monitoring manager 402 may utilize a packet capture of a Mac operating system to collect, monitor, and/or analyze user traffic activity. Additionally, monitoring manager 402 may utilize an event trace (e.g., tracing at least one of transmission control protocol, internet protocol, or user datagram protocol information on packets associated with the real-time user traffic activity) of a Windows operating system to collect, monitor, and/or analyze user traffic activity.

Each network flow monitored by monitoring manager 402 may be represented by a tuple. For instance, each network flow may be represented by the five-tuple of (source IP address, source port, destination IP address, destination port, process ID). The process ID portion of the tuple may refer to the process that sent and/or received the data to and/or from remote servers.

Monitoring manager 402 may include an active process list service that may expand and/or augment each of the network flows. For example, monitoring manager 402 may modify each of the network flows to include the underlying process' executable full path. As such, each process flow may be represented by the augmented six-tuple of (source IP address, source port, destination IP address, destination port, process ID, executable full path).

Monitoring manager 402 may provide each of the network flows to tracking manager 404. For example, monitoring manager 402 may deliver a process flow and/or the six-tuple representation of the process flow to the tracking manager 404.

Tracking manager 404 may maintain a mapping of all the processes in a system. For example, tracking manager 404 may maintain a map of the processes for a user's computing device. In addition, tracking manager 404 may maintain a least recently used (LRU) cache. The LRU cache may maintain a cache of N flows associated with each process. The flows in the LRU cache may be periodically removed according to an LRU caching scheme where the least recently used are removed first upon filling the cache.

During execution, tracking manager 404 may receive and/or analyze the process flows from monitoring manager 402. Tracking manager 404 may determine whether each of these flows is being seen for the first time for a particular process, when was the last time an existing flow for a particular process has been seen, and/or whether an existing flow for a particular process is evicted from the LRU.

Tracking manager 404 may publish events to automated session test configuration manager 406. For example, tracking manager 404 may publish an event notifying automated session test configuration manager 406 every time a flow for a particular process is seen for the first time. Further, tracking manager 404 may publish an event notifying automated session test configuration manager 406 every time an existing flow for a particular process has not been seen for a particular period of time. Furthermore, tracking manager 404 may publish an event notifying automated session test configuration manager 406 every time an existing flow for a particular process is evicted from the LRU cache.

Automated session test configuration manager 406 may receive each of the events published by tracking manager 404. Automated session test configuration manager 406 may maintain a list of one or more automated session test (AST) profiles and/or a list of one or more process flows for those AST profiles that are currently being monitored (e.g., subject of one or more network tests). Each AST profile may consist of a list of process-specific configurations. In turn, each process-specific configuration may include the following elements: a process filename, a remote server selection for UDP, a remote server selector for TCP.

The process filename may reference the filename, without path, that contains the executable code of a particular process (e.g., te-agent.exe, te-user-agent, notepad.exe, etc.). The remote server selector may include the following elements: the maximum number of remote servers to monitor, a list of remote Internet protocol version 4 (IPv4) networks, a list of remote Internet protocol version 6 (IPv6) networks, and/or a list of remote ports.

During execution, automated session test configuration manager 406 may check whether a particular flow being analyzed matches an AST profile and/or is on list of already monitored process flows. Automated session test configuration manager 406 may determine that an AST profile matches a process flow, denoted by its respective augmented six-tuple (source IP address, source port, destination IP address, destination port, process ID, executable path), if certain conditions are met. For example, automated session test configuration manager 406 may determine that an AST profile matches a process flow only if the following conditions (and in some instances all the following conditions) are satisfied: the last component of the executable's full path is equal to the process filename, the destination IP address is a subnet of any network included in the list of either remote IPv4 networks or remote IPv6 networks, and/or the destination port is present in the list of remote ports.

During execution, automated session test configuration manager 406 may also check whether a particular process flow is added to or removed for a particular application. For example, automated session test configuration manager 406 may determine whether a particular process flow is added for a particular application based on whether the tracking manager 404 reported it being seen for the first time. Automated session test configuration manager 406 may determine whether a particular process flow is being removed for a particular application based on whether tracking manager 404 reported it having not been seen for a period of time and/or that it is being evicted from the LRU.

Based on whether a particular process flow being analyzed matches a monitored AST profile and/or whether that particular process flow is added or removed to the particular application, automated session test configuration manager 406 may determine and/or modify monitoring and/or testing configurations associated with that flow. For example, if automated session test configuration manager 406 determines that a process flow associated with a network flow delivered from a user's device does not match any AST profiles maintained by automated session test configuration manager 406, then automated session test configuration manager 406 may ignore the process flow for the purposes of configurating testing for its associated application.

Otherwise, if automated session test configuration manager 406 determines that the process flow associated with a network flow delivered from a user's device is being added and that it is already monitored for a particular application that matches an AST profile, then automated session test configuration manager 406 may make a secondary determination. Namely, automated session test configuration manager 406 may determine whether a maximum number of tests for the particular matching AST profile has been reached. If the maximum number of tests has been reached, automated session test configuration manager 406 may ignore the process flow for the purposes of configurating testing for its associated application. Alternatively, if the maximum number of tests has not been reached, automated session test configuration manager 406 may add the process flow to the monitored flow list for that particular application and it may cause network tests to be dispatched and/or updated to test for the process flow's remote server as identified by the tuple (destination IP address, destination port).

If automated session test configuration manager 406 determines that the process flow associated with a network flow delivered from a user's device is being removed and that it is not already monitored for a particular application that matches an AST profile, then automated session test configuration manager 406 may ignore the process flow for the purposes of configurating testing for its associated application. Conversely, automated session test configuration manager 406 may determine that the process flow associated with a network flow delivered from a user's device is being removed and that it is already monitored for a particular application that matches an AST profile. In such instances, automated session test configuration manager 406 may remove the process flow from the list of monitored process flows for the particular application with which it is associated and may update network tests to discontinue testing for that particular flow's remote server, as identified by the tuple (destination IP address, destination port).

Automated session test configuration manager 406 may apply the modification and/or updates that it identified for session testing configurations. For example, automated session test configuration manager 406 may cause tests of a server of a particular application to be scheduled, conducted, and/or discontinued according to its determinations. For example, automated session test configuration manager 406 data, such as modified session testing configurations, testing results, etc. may be sent to and/or gathered by endpoint agents for scheduling and/or execution.

The automated session test configuration manager 406 data may be gathered by the endpoint agent and/or be uploaded periodically where it is enriched (e.g., with geo-location data, etc.) and stored for display in a user interface and/or accessed via a developer API. The user interface may allow a user to configure new automated session tests. For example, a new automated session test may be configured by selecting the type of application to monitor (e.g., collaboration application, video conferencing application, chat application, Webex, Zoom, Microsoft Teams, etc.). This may create a basic session test configuration which may then be distributed to applicable end user machines in the same was as a scheduled test.

The user interface may also allow a user to view the results of the testing across a group (e.g., workforce) in the user interface. For example, a dedicated page may be provided to view the data for an automated session test, which can be filtered, for example, for specific subsets of users, all users, or particular geographies or networks that an observability administrator is interested in. Path visualization technology of observability platforms may be used to display the route that the network traffic takes from the end user to the service being tested.

Additionally, the user interface may allow a user to view the results for a single user in the user interface. That is, a single agent view provided by an observability platform may be extended to include automated session test data for a single, specific agent. This additional data may be valuable in helping call center users to quickly troubleshoot issues reported for a specific application by a specific user Likewise, the automated session testing extension to the developer API may allow a user more insight into the testing of particular application servers. For example, the developer API may be extended to allow a user to create, read, update, and/or delete automated session tests and associated test data. Additionally, the developer API may be extended to allow users to filter retrieved test data, for example by a collaboration session ID assigned by a collaboration application, so that only relevant data is obtained.

Therefore, testing process 248 may enable an endpoint agent to identify and test the actual servers where a native application is sending data to and/or expecting data from. By monitoring real-time user traffic activity associated with particular applications, determining the set of one or more current servers corresponding to the real-time user traffic activity, associating the real-time user traffic activity to one or more user processes, mapping the one or more user processes to their particular application and configuring one or more tests directed to the set of one or more current servers for the particular application, testing process 248 is able to run automated session tests to those servers in order to collect useful metrics that accurately capture and reflect the observed user UX for that application.

Figure 5:
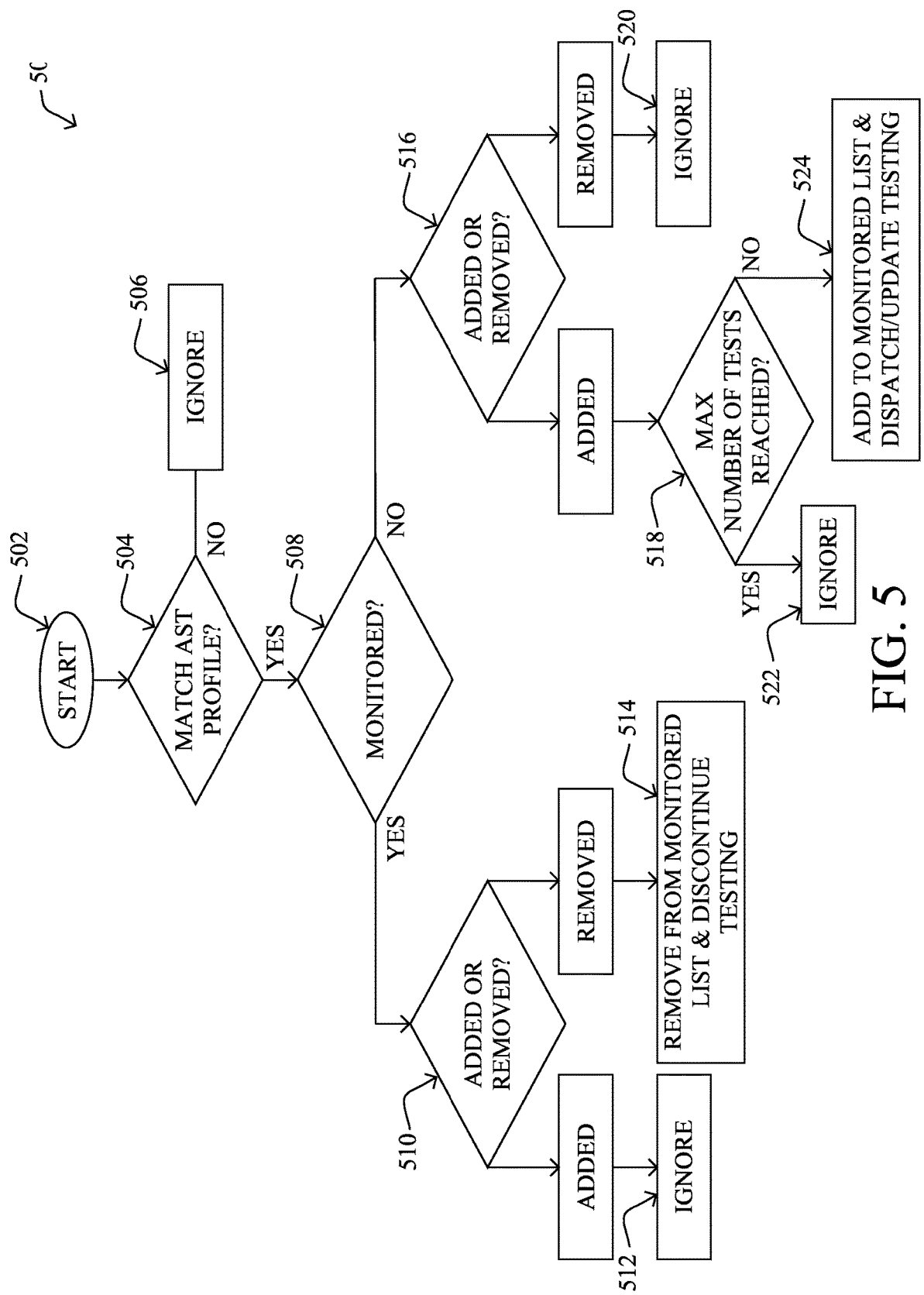
FIG. 5 illustrates an example of a process flow for traffic-based automated session testing.

FIG. 5 illustrates an example of a process flow 500 for traffic-based automated session testing, according to various embodiments. Specifically, flow 500 illustrates an example of steering logic for configuring automated session testing of servers for a particular process of a particular application.

Flow 500 may begin at box 502. In various embodiments, box 502 may correspond to detection, receipt, and/or analysis of a real-time network process flow for a particular native application executing on a user device. Upon detecting, receiving, and/or analyzing the real-time network process flow from the user device, flow 500 may proceed to box 504.

At box 504, it may be determined whether the process flow matches an existing AST profile for an application. If the process flow matches an AST profile, then flow 500 may proceed to box 506 where the process flow may be ignored for the purposes of configuring testing for its associated application. Conversely, if the process flow matches an existing AST profile, then flow 500 may proceed to box 508.

At box 508, it may be determined whether the process flow is monitored for that particular application. For example, it may be determined that the process flow is monitored when the process flow matches one on a list of monitored process flows for the particular application that matches the AST profile. Conversely, it may be determined that the process flow is not monitored when the process flow does not match one on a list of monitored process flows for the particular application that matches the AST profile.

If, at box 508, it is determined that the process flow is monitored, then flow 500 may proceed to box 510. At box 510, it may be determined whether the process flow is being added to or removed from a particular application. If the process flow is being added, then flow 500 may proceed to box 512 where the process flow may be ignored for the purposes of configurating testing for its associated application. Conversely, if the process flow is being removed, then flow 500 may proceed to box 514 where the process flow may be removed from a monitored flow list for the particular application and any existing testing associated with the process flow may be discontinued.

If, at box 508, it is determined that the process flow is not monitored, then flow 500 may proceed to box 516. At box 516, it may be determined whether the process flow is being added to or removed from a particular application. If the process flow is being removed, then flow 500 may proceed to box 520 where the process flow may be ignored for the purposes of configurating testing for its associated application. Conversely, if the process flow is being added, then flow 500 may proceed to box 518 where a determination may be made if a maximum number of tests for that particular AST profile has been reached. If, at box 518, it is determined that the maximum number of tests has been reached, then flow 500 may proceed to box 522 where the process flow may be ignored for the purposes of configurating testing for its associated application. Conversely, if, at box 518, it is determined that the maximum number of tests has not been reached, then flow 500 may proceed to box 524 where the process flow may be added to a monitored flow list for the particular application and testing to the particular application's servers associated with the process flow may be dispatched and/or updated.

Figure 6:
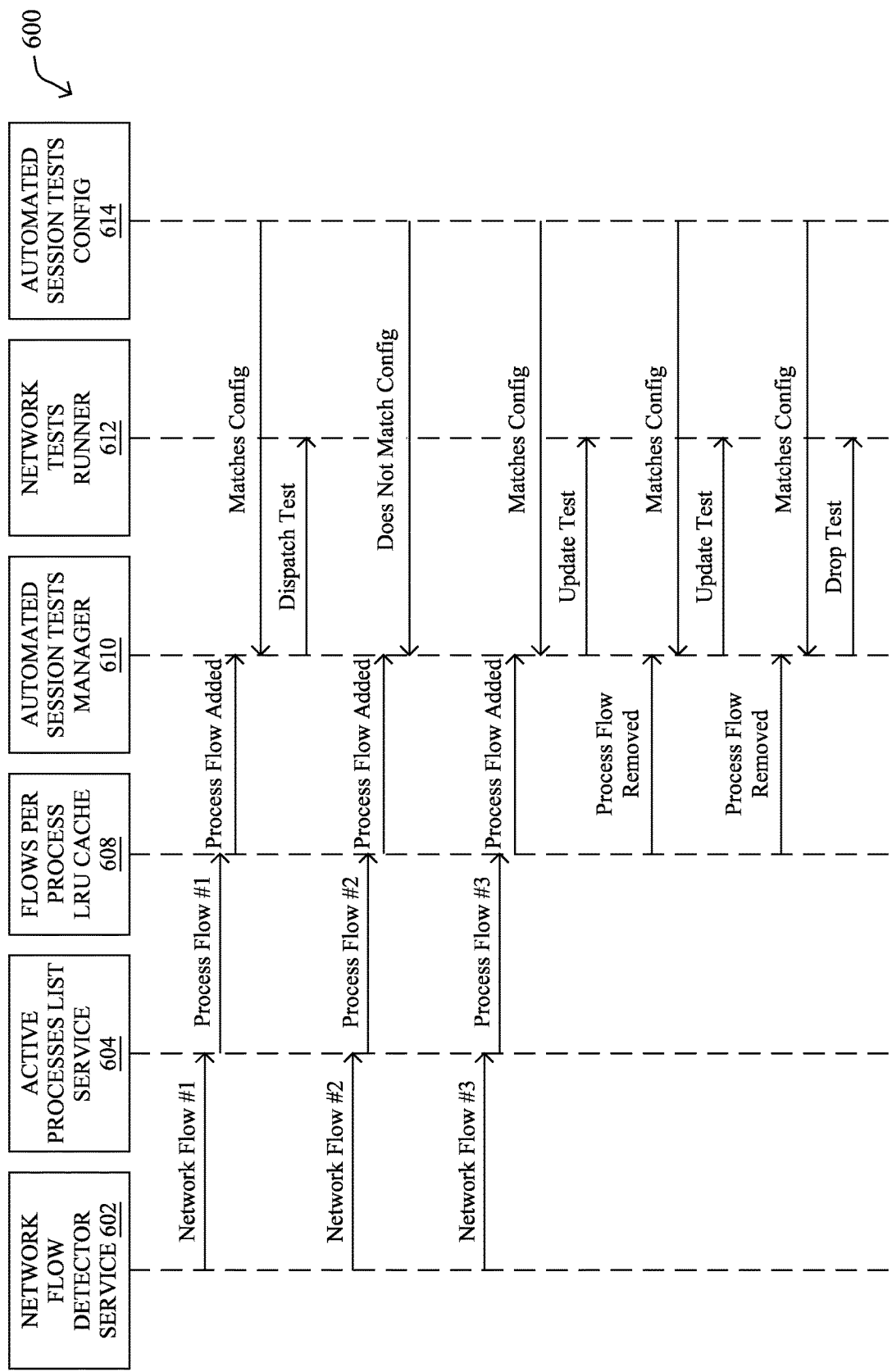
FIG. 6 illustrates an example of a sequence for traffic-based automated session testing.

FIG. 6 illustrates an example of a sequence 600 for traffic-based automated session testing, according to various embodiments. Specifically, sequence 600 illustrates an example of a sequence of automated session testing for a single application.

In sequence 600 a network flow service detector 602 may detect all network flows from all TCP and UDP traffic on a user computing device in real-time. For example, network flow service detector 602 may detect three network flows (Network flow #1, Network flow #2, and Network flow #3). Each network flow may be represented by the tuple (source IP address, source port, destination IP address, destination port, process ID).

Network flow service detector 602 may provide the network flows to active processes list service 604. Active processes list service 604 may associate each network flow with a particular application based on its tuple and/or which process is receiving a packet. Active processes list service 604 may expand and/or augment the network flows to process flows (e.g., Process Flow #1, Process Flow #2, Process Flow #3) which include the associated process' executable full path within the tuple.

All the resulting process flows for the application may be provided to a process network flow tracking service. This may include a flows per process LRU cache 608. From here, events may be published each time a flow for a particular process is seen for the first time, an existing flow for a particular process is not seen at all for an X period of time and/or an existing flow for a particular process is evicted from the flows per process LRU cache 608.

All the events published by the process network flow tracking service may be received by the automated session tests manager 610. Automated session tests manager 610 may determine whether each of the process flows matches a configuration profile in a list of automated session tests configurations 614. If the process flow does not match a configuration profile, then it is ignored. Likewise, if the process flow does match a configuration profile, is being added, but is already monitored, then it is ignored.

If the process flow does match a configuration profile, is being added, is not yet monitored, and/or a maximum amount of tests for the configuration profile is not yet reached, then the process flow may be added to a monitored flow list for that particular application and network tests may be dispatched and/or updated to test for the process flows remote server identified by the tuple (destination IP address, destination port).

If the process flow does match a configuration profile, is being removed, and/or is not yet monitored then it may be ignored. Finally, if the process flow does match a configuration profile, is being removed, and/or is already monitored for that particular application then the process flow may be removed from the monitored flow list for that particular application and network tests may be updated to drop testing for that particular flow's remote server identified by the tuple (destination IP address, destination port).

Figure 7:
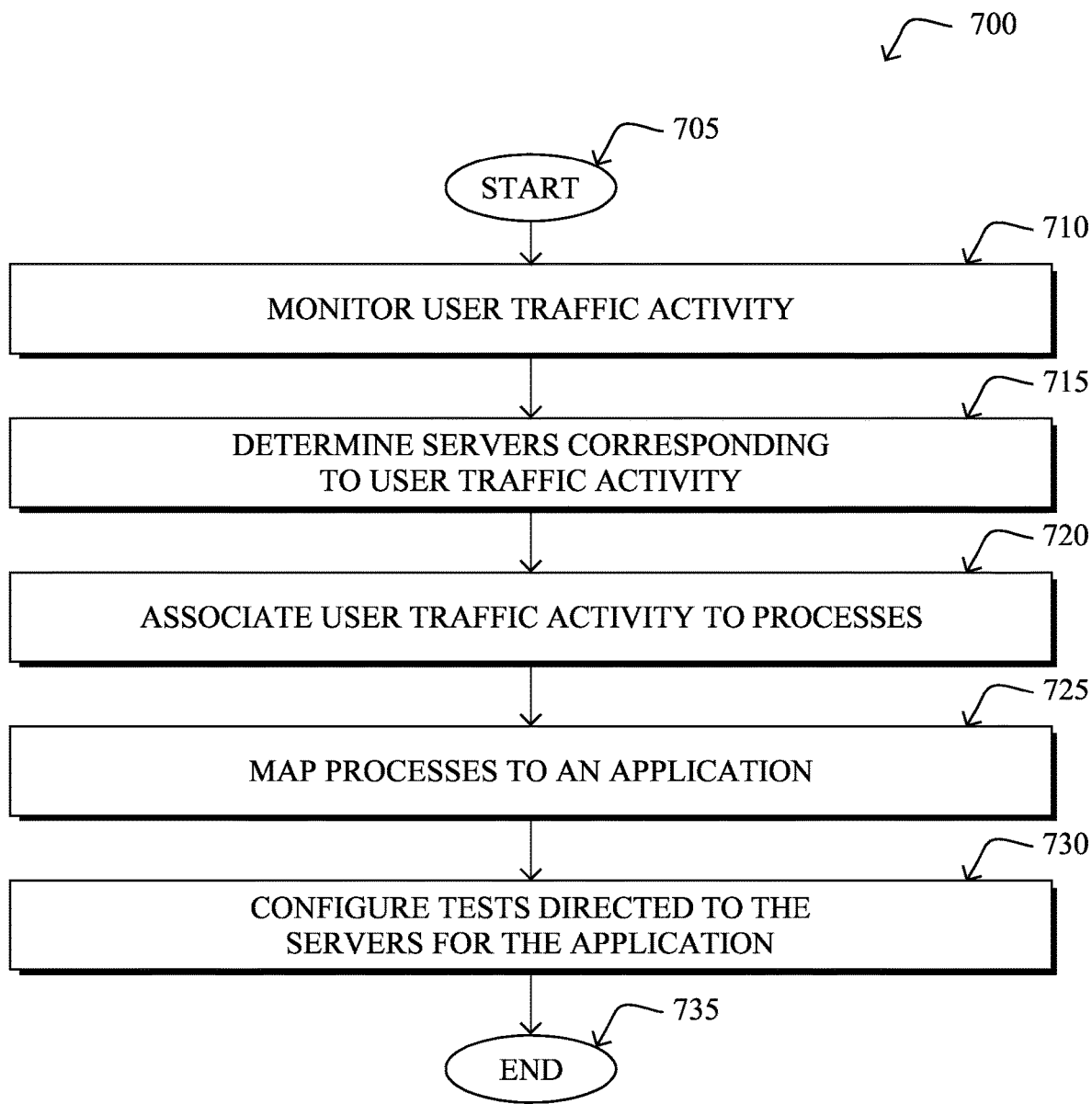
FIG. 7 illustrates an example simplified procedure for traffic-based automated session testing in accordance with one or more embodiments described herein.

In closing, FIG. 7 illustrates an example simplified procedure for traffic-based automated session tests in accordance with one or more embodiments described herein. For example, a non-generic, specifically configured device (e.g., device 200) may perform procedure 700 by executing stored instructions (e.g., process 248).

The procedure 700 may start at step 705, and continues to step 710, where, as described in greater detail above, a process may include monitoring real-time user traffic activity. In various embodiments, monitoring the real-time user traffic activity may include performing a packet capture for the particular application on the real-time user traffic activity. In some embodiments, monitoring the real-time user traffic activity may include performing event tracing on the real-time user traffic activity. Performing event tracing may include tracing at least one of transmission control protocol, internet protocol, or user datagram protocol information on packets associated with the real-time user traffic activity.

At step 715, the process may include determining a set of one or more current servers corresponding to the real-time user traffic activity. At step 720, the process may include associating the real-time user traffic activity to one or more user processes. At step 725, the process may include mapping the one or more user processes to a particular application.

In step 730, the process may include configuring one or more tests directed to the set of one or more current servers for the particular application. Configuring the one or more tests may include initiating one or more new tests directed to the set of one or more current servers. The one or more new tests may be initiated based on a determination that the one or more user processes corresponds to an existing configuration profile and the one or more user processes are not already monitored for that particular application. Initiating the one or more new tests directed to the set of one or more current servers may be based additionally on an amount of existing tests for the existing configuration profile. In various embodiments, initiating the one or more new tests directed to the set of one or more current servers may include adding the one or more user processes to a monitored process list for that particular application.

The simplified procedure 700 may then end in step 735, notably with the ability to continue monitoring real-time user activity and configuring and/or reconfiguring session tests direct to servers. Other steps may also be included generally within procedure 700. For example, such steps (or, more generally, such additions to steps already specifically illustrated above), may include: dynamically reconfiguring the one or more tests in response to detecting a modification of the real-time user traffic activity; dynamically reconfiguring the one or more tests comprises may include discontinuing the one or more tests directed to the set of one or more current servers for the particular application (e.g., based on a determination that the one or more user processes corresponds to an existing configuration profile, is already monitored for that particular application, and is removed from a cache of recent user processes) dynamically reconfiguring the one or more tests may include removing the one or more user processes from a monitored process list for that particular application; and so on.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce traffic-based automated session testing that enables the dynamic identification and active testing of servers used by native applications running on any operating system (e.g., Mac, Windows, etc.). The testing techniques facilitate, for each of the dynamically identified servers, key network performance metrics to be collected and/or visualized (e.g., via an observability platform). In some instance, the testing techniques facilitate a remote server, used by a native application, being dynamically discovered whether it uses transmission control protocol/Internet protocol (TCP/IP), user datagram protocol/Internet protocol (UDP/IP), etc. for communicating with the native application's process(es). Therefore, automated session tests may be automatically configured and/or run to those servers that are involved in providing a native application's process(es) in order to collect useful metrics that accurately capture and reflect the observed user UX for that application. As a result, targeted testing of specific remote servers used by a native application can be achieved even where those applications decide at runtime which server to send data to and/or which protocol to use for sending the data, thereby improving the operation of computer networking technology.

Illustratively, the techniques described herein may be performed by hardware, software, and/or firmware, such as in accordance with the illustrative testing process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: monitoring, by a process, real-time user traffic activity; determining, by the process, a set of one or more current servers corresponding to the real-time user traffic activity; associating, by the process, the real-time user traffic activity to one or more user processes; mapping, by the process, the one or more user processes to a particular application; and configuring, by the process, one or more tests directed to the set of one or more current servers for the particular application.

In one embodiment, the method may further comprise dynamically reconfiguring the one or more tests in response to detecting a modification of the real-time user traffic activity. In one embodiment, dynamically reconfiguring the one or more tests comprises discontinuing the one or more tests. In one embodiment, the one or more tests are discontinued based on a determination that the one or more user processes corresponds to an existing configuration profile, is already monitored for that particular application, and is removed from a cache of recent user processes. In one embodiment, dynamically reconfiguring the one or more tests comprises removing the one or more user processes from a monitored process list for that particular application.

In one embodiment, configuring the one or more tests comprises initiating one or more new tests directed to the set of one or more current servers. In one embodiment, the one or more new tests are initiated based on a determination that the one or more user processes corresponds to an existing configuration profile and the one or more user processes are not already monitored for that particular application. In one embodiment, initiating the one or more new tests directed to the set of one or more current servers is based additionally on an amount of existing tests for the existing configuration profile. In one embodiment, initiating the one or more new tests directed to the set of one or more current servers further comprises adding the one or more user processes to a monitored process list for that particular application.

In one embodiment, monitoring the real-time user traffic activity comprises performing a packet capture for the particular application on the real-time user traffic activity. In one embodiment, monitoring the real-time user traffic activity comprises performing event tracing on the real-time user traffic activity. In one embodiment, performing event tracing comprises tracing at least one of transmission control protocol, internet protocol, or user datagram protocol information on packets associated with the real-time user traffic activity.

According to the embodiments herein, an illustrative tangible, non-transitory, computer-readable medium herein may have computer-executable instructions stored thereon that, when executed by a processor on a computer, may cause the computer to perform a method comprising: monitoring real-time user traffic activity; determining a set of one or more current servers corresponding to the real-time user traffic activity; associating the real-time user traffic activity to one or more user processes; mapping the one or more user processes to a particular application; and configuring one or more tests directed to the set of one or more current servers for the particular application.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: monitor real-time user traffic activity; determine a set of one or more current servers corresponding to that user traffic activity; associate the real-time user traffic activity to one or more user processes; map the one or more user processes to a particular application; and configure one or more tests directed to the set of one or more current servers for the particular application.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
monitoring, by a process, real-time user traffic activity;
determining, by the process, a set of one or more current servers corresponding to the real-time user traffic activity;
associating, by the process, the real-time user traffic activity to one or more user processes;
mapping, by the process, the one or more user processes to a particular application that is a native application of a user device;
configuring, by the process, one or more tests directed to the set of one or more current servers for the particular application by initiating one or more new tests directed to the set of one or more current servers; and
dynamically reconfiguring, by the process and in response to detecting a modification of the real-time user traffic activity, the one or more tests or the one or more new tests by removing the one or more user processes from a monitored process list for the particular application.

2. The method as in claim 1, wherein a given test is discontinued based on a determination that the one or more user processes corresponds to an existing configuration profile, is already monitored for the particular application, and is removed from a cache of recent user processes.

3. The method as in claim 1, wherein the one or more new tests are initiated based on a determination that the one or more user processes corresponds to an existing configuration profile and the one or more user processes are not already monitored for the particular application.

4. The method as in claim 3, wherein initiating the one or more new tests directed to the set of one or more current servers is based additionally on an amount of existing tests for the existing configuration profile.

5. The method as in claim 1, wherein initiating the one or more new tests directed to the set of one or more current servers further comprises:
adding the one or more user processes to a monitored process list for the particular application.

6. The method as in claim 1, wherein monitoring the real-time user traffic activity comprises:
performing a packet capture for the particular application on the real-time user traffic activity.

7. The method as in claim 1, wherein monitoring the real-time user traffic activity comprises:
performing event tracing on the real-time user traffic activity.

8. The method as in claim 7, wherein performing event tracing comprises:
tracing at least one of transmission control protocol, internet protocol, or user datagram protocol information on packets associated with the real-time user traffic activity.

9. A tangible, non-transitory, computer-readable medium having computer-executable instructions stored thereon that, when executed by a processor on a computer, cause the computer to perform a method comprising:
monitoring real-time user traffic activity;
determining a set of one or more current servers corresponding to the real-time user traffic activity;
associating the real-time user traffic activity to one or more user processes;
mapping the one or more user processes to a particular application that is a native application of an user device;
configuring one or more tests directed to the set of one or more current servers for the particular application by initiating one or more new tests directed to the set of one or more current servers; and dynamically reconfigure, in response to detecting a modification of the real-time user traffic activity, the one or more tests or the one or more new tests by removing the one or more user processes from a monitored process list for the particular application.

10. The tangible, non-transitory, computer-readable medium as in claim 9, wherein a given test is discontinued based on a determination that the one or more user processes corresponds to an existing configuration profile, is already monitored for the particular application, and is removed from a cache of recent user processes.

11. The tangible, non-transitory, computer-readable medium as in claim 9, wherein monitoring the real-time user traffic activity comprises:

performing a packet capture for the particular application on the real-time user traffic activity.

12. The tangible, non-transitory, computer-readable medium as in claim 9, wherein monitoring the real-time user traffic activity comprises:

performing event tracing on the real-time user traffic activity.

13. An apparatus, comprising:

one or more network interfaces to communicate with a network;

a processor coupled to the one or more network interfaces and configured to execute one or more processes; and a memory configured to store a process that is executable by the processor, the process, when executed, configured to:

monitor real-time user traffic activity;

determine a set of one or more current servers corresponding to the real-time user traffic activity;

associate the real-time user traffic activity to one or more user processes;

map the one or more user processes to a particular application that is a native application of a user device;

configure one or more tests directed to the set of one or more current servers for the particular application by initiating one or more new tests directed to the set of one or more current servers; and dynamically reconfigure, in response to detecting a modification of the real-time user traffic activity, the one or more tests or the one or more new tests by removing the one or more user processes from a monitored process list for the particular application.

\* \* \* \* \*